Aug. 5, 1969  C. ORR, JR., ET AL  3,458,974
CONTINUOUS THERMAL PRECIPITATOR
Filed Oct. 13, 1965

INVENTORS
Clyde Orr, Jr. &
Warren P. Hendrix

BY

ATTORNEYS

United States Patent Office 3,458,974
Patented Aug. 5, 1969

3,458,974
CONTINUOUS THERMAL PRECIPITATOR
Clyde Orr, Jr., Atlanta, and Warren P. Hendrix, Lawrenceville, Ga., assignors to Georgia Tech Research Institute, Georgia Institute of Technology, Atlanta, Ga., a corporation of Georgia
Filed Oct. 13, 1965, Ser. No. 495,430
Int. Cl. B01d 53/22, 59/16
U.S. Cl. 55—209
4 Claims

ABSTRACT OF THE DISCLOSURE

A mechanism for collecting and sampling particulate matter from a gas stream comprising a housing containing a rotating circular collecting surface, a heated gas stream impinging on said surface and cooling means for the said surface.

---

The present invention relates to a means for extracting particulate matter from a gas stream. More specifically, the invention relates to a means for continuous thermal precipitation of particulate material from a gas stream wherein representative samples may be obtained for a predetermined time increment.

There exist today various devices for extracting and collecting particulate matter from gas streams for the purposes of determining their amount, size, shape, and other properties of interest. These devices play an important and necessary role in major industrial cities for air pollution surveys to prevent possible health hazards from being created by industrial wastes vented to the atmosphere. In addition, these devices find use in various scientific research programs where individual gas streams and rooms may require analyses of this nature.

These prior art devices for extracting or precipitating particulate matter from gas streams have generally employed electrostatic methods, although other methods have also been used. All of these devices have suffered from one or more limitations in their operation. Among these limitations is the inability to operate indefinitely without frequent operator attention. Another limitation is that continuous sampling may not be obtained as a function of time. A further limitation is that any particular sample is not representative of any particular increment of time during which it was collected. These limitations greatly restrict the flexibility of the prior art devices when used for the above-discussed purposes.

The present invention, in addition to functioning within the capabilities of the prior art devices, provides for continuous operation and sampling over long periods of time without attention, allows sampling of the particulate matter to be obtained as a function of time, and allows representative samples for any increment of time to be obtained.

Briefly, the present invention involves thermally precipitation particulate matter from gas streams in a continuous manner upon a constantly moving surface.

It is one object of the present invention to provide a means for precipitating particulate matter from gas streams without the necessity for close attention.

It is further an object of the present invention to provide a means for sampling particulate matter from gas streams as a function of time.

Another object of the present invention is to provide a means for obtaining a deposit of particulate matter from gas streams which is representative for its particular time of collection.

Another object of the present invention is to provide a means for thermally precipitating particulate matter from gas streams into a continuous series of representative samples.

These and other objects of the present invention will become apparent to those skilled in the art upon reviewing the following discussion and accompanying illustrations wherein.

Figure 1:
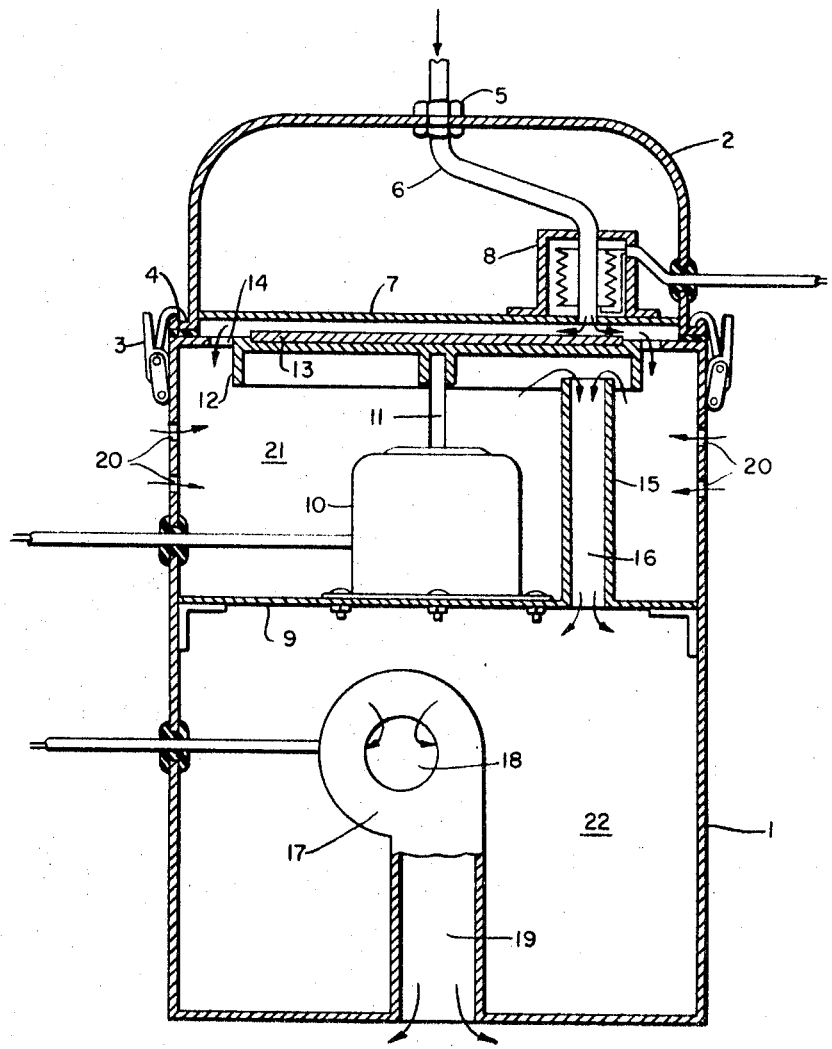
FIG. 1 is a cross sectional view of a device for thermally precipitating particulate matter from gas streams in a continuous manner according to the present invention.

Referring now to FIG. 1, there is illustrated a housing 1 having a top cover 2. The top cover is secured to housing 1 by snap fasteners 3 arranged around the periphery of the housing. Other equivalent mechanical fastening means may be used in place of such clips. A gasket 4 may be employed to provide a seal between the top cover 2 and the housing 1. This may also serve to provide a certain degree of air tightness.

The top cover 2 has a gas inlet fitting 5 attached thereto. The particle containing gas stream to be analyzed is introduced to the device through this fitting. Tube 6 communicates with fitting 5 for conducting the sample gas through top cover 2. In passing through top cover 2, tube 6 also passes through heating means 8. The heating means 8 serves to heat the sample gas as it passes through tube 6. The heating means may be of any conventional type such as electrical resistance, gas flame, hot air, and the like. Heater 8 and tube 6 may be supported and held in place by bottom plate 7.

Housing 1 contains a first floor 9 supported intermediate of its height and defining a space 21 between the floor and the turntable 12. Floor 9 supports a motor 10 which in turn supplies power to rotate a shaft 11. At the top end of shaft 11 is carried a turntable 12. Resting on top of this turntable is sample collecting substrate 13. Both the substrate 13 and the turntable 12 rotate with shaft 11. The turntable and substrate are mounted in such a manner that the peripheral edge of substrate 13 is immediately below the exit end of tube 6. This allows the gas stream conducted by tube 6 to impinge on the substrate 13.

A gap 14 remains between the peripheral edge of turntable 12 and the side walls defined by housing 1 and top cover 2. This allows the gas sample to escape from the vicinity of the turntable after being impinged thereon.

Floor 9 also carries tubular conduit 15. The tubular conduit extends upward to a point closely adjacent to the lower surface of turntable 12. The central passage 16 of this conduit extends downwardly through floor 9. The side walls of housing 1 between floor 9 and the turntable 12 contain air vents 20 for drawing air into space 21. It is this arrangement of the vents and the tubular conduit that provides the novel cooling system for the turntable and collecting substrate. Below floor 9 is an open area 22 in housing 1 which contains a fan 17. The fan has an inlet 18 communicating with space 22 and an outlet 19 communicating with the exterior of the housing.

Figure 2:
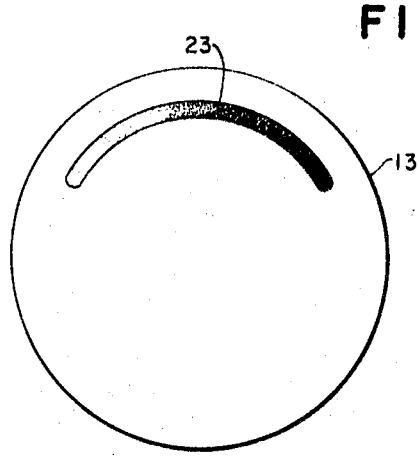
FIG. 2 is a top view of the collection substrate having a representative sample of precipitated particulate matter over a period of time.

In the operation of the device just described, the sample gas is fed to tube 6 as indicated by the arrow in the upper part of the drawing. As the sample gas is conducted through tube 6 it becomes heated by heating means 8. At this elevated temperature, the gas sample is allowed to exit from tube 6 immediately adjacent to the peripheral edge of the collecting substrate 13. The gas sample actually impinges to some extent on substrate 13. At the same time that the gas sample is being impinged against the collecting substrate, turntable 12 is being cooled by air currents created by fan 17 and indicated by the arrows in the drawing. As shown in FIG. 1, outside cooling air is drawn into the housing through vents 20, whereupon it becomes mixed with the escaping gas sample. The tubular conduit, being the only means of escape, withdraws the air and gas sample space 21. Due to the location of the conduit with respect to the turntable, air currents are set up adjacent the bottom of the turntable and thereby cool both the turntable and the collecting substrate by convection. The temperature difference between the gas sample and the collecting substrate causes a temperature gradient to be set up within the gas sample layer adjacent the cool substrate. This temperature gradient causes the particulate matter contained in the sample gas to be driven toward the cooler surface by the thermal forces which are set up. As a result, the particulate matter accumulates along a strip on the surface of the continuously moving substrate 13. As shown in FIG. 2, the strip of collected particulate matter 23 assumes a width corresponding to the exit end of tube 6 and a configuration according to the motion of the moving collecting substrate.

As may be apparent, the continuously rotating turntable 12 carrying collecting substrate 13 provides a means by which a continuous representative sample per unit time of particulate matter contained in a gas stream may be obtained. The time period for the representative sample may easily be adjusted by adjushting the speed of rotation of the turntable.

We claim:
1. An apparatus for collecting particulate matter from a gas stream comprising:
   a housing including a side wall encompassing a space and a floor positioned within said space in sealed relationship with side wall around the entire periphery of said floor;
   a motor carried within said space and having a vertically extending drive shaft extending therefrom;
   a rotatable dust collection substantially planar disc mounted in a substantially horizontally extending plane and on said shaft and rotatable therewith, said disc having an upper collecting surface positioned within said space and the periphery of said disc being spaced apart from said side wall and defining therewith a peripheral passage between the periphery of said disc and said side wall, said disc having a lower surface spaced apart from and above said floor;
   said side wall, said floor, and said disc defining therebetween a cooling chamber;
   a top cover positioned on top of said side wall in sealed relationship therewith and including a member positioned over and spaced apart from said collection disc, said member and said collection disc defining a collection chamber therebetween in communication with said cooling chamber through said peripheral passage between said disc and said side wall;
   inlet means in said top cover for directing said gas stream into impingement with said collection surface of said collection disc at a point spaced apart from the center thereof;
   heating means in said cover for heating the gas stream as it passes through said inlet means and before impingement against said collection surface;
   conduit means defining an exhaust passage therethrough having an inlet closely adjacent the lower surface of said collection disc and within said cooling chamber, said conduit means attached in sealing engagement to and extending vertically from said floor;
   an aperture in said floor fluidly communicating with said exhaust passage;
   exhaust means fluidly communicating on its inlet side with said aperture; and
   at least one venting passage defined through said side wall at and into said cooling chamber for the passage of ambient cooling air into said cooling chamber, said exhaust means drawing the gas stream from said inlet through said collection chamber into said cooling chamber through said peripheral passage and drawing the cooling air into said cooling chamber through said venting passage and subsequently withdrawing the gas stream and the cooling air into said conduit means adjacent the lower surface of said disc to cool said disc.

2. Apparatus as set forth in claim 1 wherein said inlet of said conduit means is located in alignment with and on the opposite side of said disc from the point of impingement of the gas stream on said collection surface of said collection disc.

3. Apparatus as set forth in claim 1 wherein said housing defines an exhaust chamber below said floor and in fluid communication with said cooling chamber through said conduit means and wherein said inlet side of said exhaust means is in fluid communication with said exhaust chamber.

4. Apparatus as set forth in claim 3 wherein said exhaust means is located in said exhaust chamber and whereing said exhaust means includes a discharge passage communicating with the exterior of said housing through which the gas stream and the cooling air are discharged.

References Cited

UNITED STATES PATENTS

| 2,115,541 | 4/1938 | Schlunz | 55—467 X |
| 2,313,676 | 3/1943 | Shaver | 55—471 X |
| 2,394,357 | 2/1946 | Beese. | |
| 2,833,370 | 5/1958 | Sherwood | 55—209 |
| 2,839,155 | 6/1958 | Martin | 55—209 |
| 2,947,382 | 8/1960 | Orr | 55—209 |
| 3,043,703 | 7/1962 | Schlauch | 55—269 X |
| 3,052,357 | 9/1962 | Schultz-Grunow | 210—176 |
| 3,136,627 | 6/1964 | Caldwell et al | |
| 3,148,146 | 9/1964 | Asnes et al. | 233—11 |
| 3,274,756 | 9/1966 | Stern | 55—47 X |
| 3,291,205 | 12/1966 | Harris et al. | 55—269 X |

FOREIGN PATENTS

| 421,075 | 11/1925 | Germany. |
| 616,857 | 8/1935 | Germany. |

OTHER REFERENCES

Farber et al., "Effect of Gravitational Field on the Thermal Diffusion Separation Method," Journal of Chemical Physics, volume 8, December, 1940, pp. 965–969.

Schultz-Grunow, Fritz, German printed application No. 1,132,546, printed July 1962.

HARRY B. THORNTON, Primary Examiner

D. E. TALBERT, Jr., Assistant Examiner

U.S. Cl. X.R.

55—267, 400, 472; 73—28; 210—72, 176; 233—2